(12) United States Patent
Liu et al.

(10) Patent No.: US 11,577,614 B2
(45) Date of Patent: Feb. 14, 2023

(54) SUSPENSION FRAME ASSEMBLY OF MAGNETIC LEVITATION VEHICLE

(71) Applicant: CRRC QINGDAO SIFANG CO., LTD., Shandong (CN)

(72) Inventors: Xiankai Liu, Shandong (CN); Xiaojun Deng, Shandong (CN); Dalian Yu, Shandong (CN); Huijuan Li, Shandong (CN); Haixia Guo, Shandong (CN); Fujie Jiang, Shandong (CN); Zhaofu Li, Shandong (CN); Jin Luan, Shandong (CN); Hao Jin, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 539 days.

(21) Appl. No.: 16/616,963

(22) PCT Filed: May 3, 2018

(86) PCT No.: PCT/CN2018/085429
§ 371 (c)(1),
(2) Date: Nov. 25, 2019

(87) PCT Pub. No.: WO2019/024554
PCT Pub. Date: Feb. 7, 2019

(65) Prior Publication Data
US 2020/0254884 A1     Aug. 13, 2020

(30) Foreign Application Priority Data

Aug. 3, 2017   (CN) .......................... 201710656775.8

(51) Int. Cl.
*B60L 13/04*     (2006.01)
*B61B 13/08*     (2006.01)
(Continued)

(52) U.S. Cl.
CPC .............. *B60L 13/04* (2013.01); *B61B 13/08* (2013.01); *B60L 13/03* (2013.01); *B60L 13/10* (2013.01);
(Continued)

(58) Field of Classification Search
CPC .......... B60L 13/03; B60L 13/04; B60L 13/10; B60L 2200/26; B61B 13/08; F16C 2323/10
See application file for complete search history.

(56) References Cited

U.S. PATENT DOCUMENTS

| 4,787,317 A | 11/1988 | Bohn et al. |
| 2011/0041722 A1 | 2/2011 | Huber et al. |

FOREIGN PATENT DOCUMENTS

| CN | 101045457 A | 10/2007 |
| CN | 101062662 A | 10/2007 |

(Continued)

OTHER PUBLICATIONS

Search Report dated Dec. 2, 2020 for European patent application No. 18840954.4, 9 pages.

(Continued)

*Primary Examiner* — Robert J McCarry, Jr.
(74) *Attorney, Agent, or Firm* — Yue (Robert) Xu; Apex Attorneys at Law, LLP

(57) ABSTRACT

A suspension frame assembly of a magnetic levitation vehicle, includes multiple suspension frames which are sequentially connected; and each suspension frame includes two longitudinal beam bodies arranged in parallel. A supporting wheel and a holding arm are fixedly provided on both ends of each longitudinal beam body; and two anti-rolling devices mounted between mounting frames of two of the supporting wheels at a same end of the two longitudinal beam bodies; and the two longitudinal beam bodies of one (Continued)

of the suspension frames are respectively hingedly connected to the two longitudinal beam bodies of an adjacent suspension frame; an air-spring arm beam is provided at a hinged part of the two suspension frames, and is mounted on the holding arm of one of the two longitudinal beam bodies which are hingedly connected.

18 Claims, 5 Drawing Sheets

(51) Int. Cl.
  *B60L 13/03* (2006.01)
  *B60L 13/10* (2006.01)
(52) U.S. Cl.
  CPC ....... *B60L 2200/26* (2013.01); *F16C 2326/10* (2013.01)

(56) References Cited

FOREIGN PATENT DOCUMENTS

| CN | 101624054 A | | 1/2010 |
|---|---|---|---|
| CN | 101954913 A | | 1/2011 |
| CN | 106476832 A | | 3/2017 |
| CN | 107599888 A | | 1/2018 |
| DE | 102009058974 A1 | | 6/2011 |
| EP | 0266496 A2 | | 5/1988 |
| JP | S5755704 A | | 4/1982 |
| JP | H06316263 A | | 11/1994 |
| JP | H09123908 A | | 5/1997 |
| JP | 2007091039 A | | 4/2007 |
| JP | 2007091039 A | * | 4/2007 |
| JP | 2009254099 A | | 10/2009 |
| JP | 2009254099 A | * | 10/2009 |
| JP | 2009255603 A | | 11/2009 |
| JP | 2012227435 A | | 11/2012 |

OTHER PUBLICATIONS

Chengxin Fan et al., "Risk analysis based on fuzzy comprehensive evaluation for maglev train bogie", 2015 Chinese Automation Congress (CAC), IEEE, Nov. 27, 2015, pp. 952-956.

First Office Action dated Nov. 2, 2020 for Japanese patent application No. 2019-564167, English translation provided by Global Dossier.

International Search Report for PCT/CN2018/085429 dated Aug. 1, 2018, ISA/CN.

CNIPA First Office Action corresponding to Application No. 201710656775.8; dated Feb. 28, 2019.

* cited by examiner

SUSPENSION FRAME ASSEMBLY OF MAGNETIC LEVITATION VEHICLE

The application is the national phase of International Application No. PCT/CN2018/085429, titled "SUSPENSION FRAME ASSEMBLY OF MAGNETIC LEVITATION VEHICLE", filed on May 3, 2018, which claims the priority to Chinese patent application No. 201710656775.8 titled "SUSPENSION FRAME ASSEMBLY OF MAGNETIC LEVITATION VEHICLE", filed with the China National Intellectual Property Administration on Aug. 3, 2017, the entire disclosures of the applications are incorporated herein by reference.

FIELD

The present application relates to the field of magnetic levitation technology, and in particular to a suspension frame assembly for a magnetic levitation vehicle.

BACKGROUND

As a new type of vehicle, a low and intermediate speed magnetic levitation vehicle has the advantages of low noise, strong accelerating and braking capability, strong climbing capability, small turning radius, small vibration and good comfort and the like. As one of important members of the magnetic levitation vehicle, a suspension frame assembly affects the running performance of the magnetic levitation vehicle.

The carrying capacity of the low and intermediate speed magnetic levitation vehicle is limited by the performance of the suspension magnet and the factors affecting the suspension condition. Therefore, how to minimize the self-weight and improve the suspension capacity has become a technical problem to be solved by those skilled in the art at present.

SUMMARY

An object of the present application is to provide a suspension frame assembly for a magnetic levitation vehicle, which has a lighter self-weight and can effectively improve the suspension capability.

In order to solve the above technical problems, a suspension frame assembly for a magnetic levitation vehicle is provided according to the present application, which includes: multiple suspension frames which are sequentially connected; and each of the suspension frames includes:

two longitudinal beam bodies arranged in parallel, wherein a supporting wheel and a holding arm are fixedly provided on both ends of each of the longitudinal beam bodies; and two anti-rolling devices, which are mounted between mounting frames of two of the supporting wheels at a same end of the two longitudinal beam bodies; and wherein the two longitudinal beam bodies of one of the suspension frames are respectively hingedly connected to the two longitudinal beam bodies of an adjacent suspension frame; an air-spring arm beam for mounting an air spring is provided at a hinged part of the two suspension frames, and the air-spring arm beam is mounted on the holding arm of one of the two longitudinal beam bodies which are hingedly connected; and each holding arm of the two longitudinal beam bodies at both ends of the suspension frame assembly is mounted with the air-spring arm beam for mounting the air spring.

The suspension frame assembly of the magnetic levitation vehicle according to the present application includes multiple suspension frames which are sequentially connected. In each of the suspension frames, a supporting wheel is fixed at both ends of each of the longitudinal beam bodies. Compared with the existing hydraulic lifting supporting wheel which is commonly used, the supporting wheel with a fixed form can save the hydraulic structure, which helps to reduce the overall weight of the single suspension frame, thereby reducing the overall weight of the suspension frame assembly. In the suspension frame assembly, an air-spring arm beam for mounting the air spring is provided at a hinged part of the two adjacent suspension frames, and each holding arm of the two longitudinal beam bodies at both ends of the suspension frame assembly are mounted with the air-spring arm beam for mounting the air spring. Thus, compared with the existing solution that four ends of each of the suspension frames of the suspension frame assembly are provided with the air springs, in this solution, the number of the air springs can be greatly reduced, and the overall weight of the suspension frame assembly can be further reduced, and in conjunction with the above supporting wheel with the fixed form, the suspension frame assembly is more lightweight, thereby improving the suspension capability. In addition, the reduction in the number of the air springs is also advantageous for the cooperative control of the air springs.

Optionally, both sides of each of the anti-rolling devices are each connected to the mounting frame of the supporting wheel at a corresponding side by a diagonal pull rod and a horizontal pull rod.

Optionally, the diagonal pull rod is hingedly connected to the mounting frame of the supporting wheel by a ball joint bearing for the diagonal pull rod, to allow the diagonal pull rod to have a predetermined rotation angle adjustment range; the horizontal pull rod is hingedly connected to the mounting frame of the supporting wheel by a ball joint bearing for the horizontal pull rod, to allow the horizontal pull rod to have a predetermined rotation angle adjustment range.

Optionally, a lateral stop is mounted on each of opposite sides of the two holding arms of each of the longitudinal beam bodies, and a distance from the lateral stop to an end of a suspension magnet module at a corresponding side is ⅕ of a length of the suspension magnet module.

Optionally, a brake caliper is mounted on a middle portion of each of the longitudinal beam bodies, a pull rod is provided on both sides of the brake caliper, and the pull rod has one end hingedly connected to the brake caliper and another end hingedly connected to the lateral stop at a corresponding side.

Optionally, a wear-resistant member is fixed on an inner side of the lateral stop.

Optionally, each of the suspension frames further includes:

two suspension magnet modules respectively provided on the two longitudinal beam bodies, and two ends of each of the suspension magnet modules are fixedly connected to the holding arms at the corresponding sides respectively.

Optionally, an anti-vibration plate is provided at a middle portion of each of the suspension magnet modules. Optionally, each of the longitudinal beam bodies is further provided with a traction linear motor extending along a length direction of the longitudinal beam body.

Optionally, each of the longitudinal beam bodies includes a linear motor beam mounted between the two holding arms and configured to mount the traction linear motor.

Figure 1:
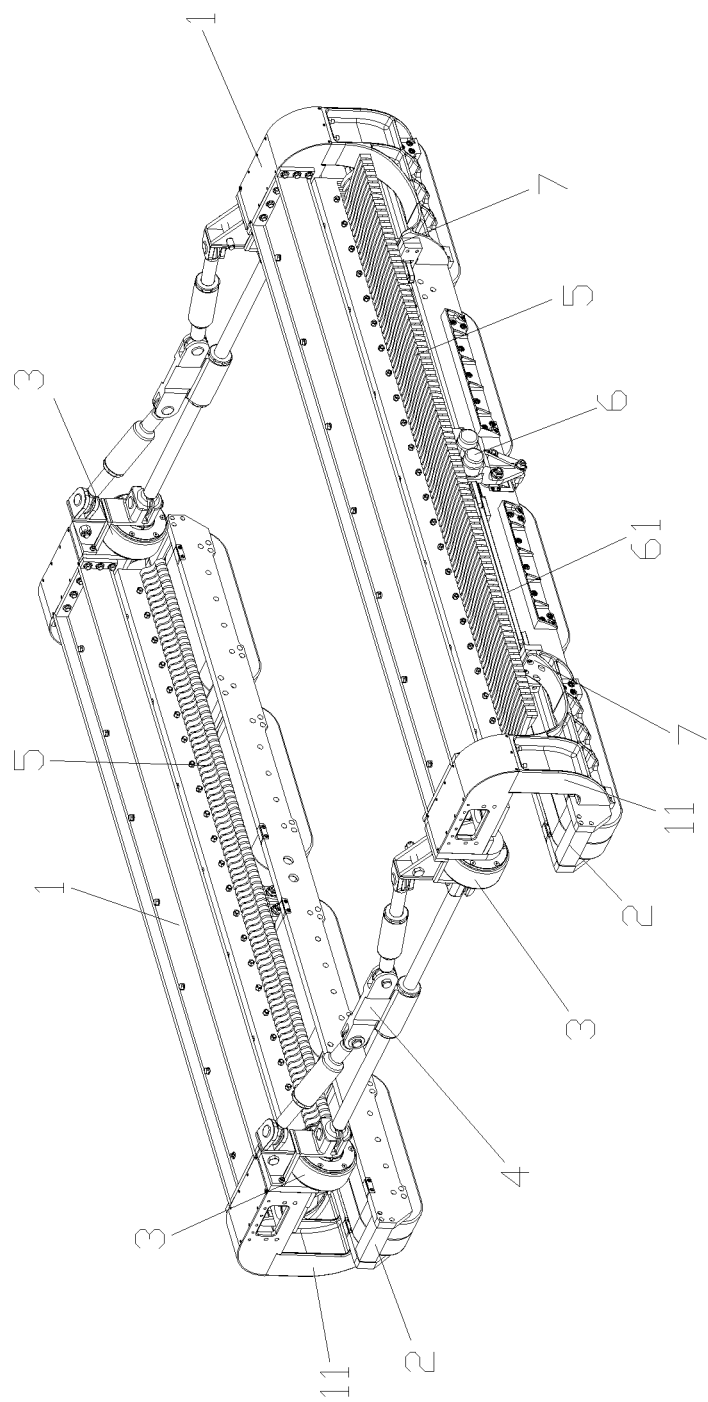
FIG. 1 is a schematic view showing the structure of a suspension frame of a magnetic levitation vehicle according to an embodiment of the present application.

One-to-one correspondences between names of components and reference numerals in FIGS. 1 to 7:

| | | | |
|---|---|---|---|
| 100 | suspension frame, | 200 | vehicle body; |
| 1 | longitudinal beam body, | 11 | holding arm, |
| 12 | anti-vibration plate, | 13 | linear motor beam, |
| 2 | suspension magnet module, | 3 | supporting wheel, |
| 4 | anti-rolling device, | 41 | horizontal pull rod, |
| 42 | diagonal pull rod, | 5 | traction linear motor, |
| 6 | brake caliper, | 61 | pull rod, |
| 7 | lateral stop, | 71 | wear-resistant member, |
| 8 | air-spring arm beam. | | |

DETAILED DESCRIPTION

A core of the present application is to provide a suspension frame assembly for a magnetic levitation vehicle, which has a lighter self-weight and can effectively improve the suspension capability.

In order to make those skilled in the art to better understand the solution of the present application, the present application will be further described in detail below in conjunction with the accompanying drawings and specific embodiments.

Figure 2:
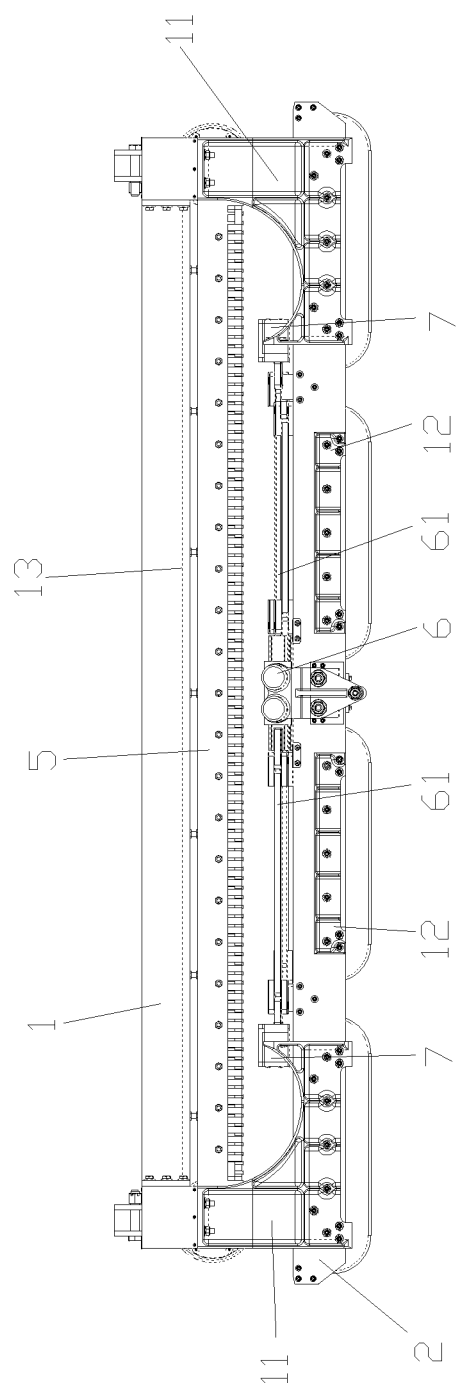
FIG. 2 is a front view of the suspension frame shown in FIG. 1.
Figure 3:
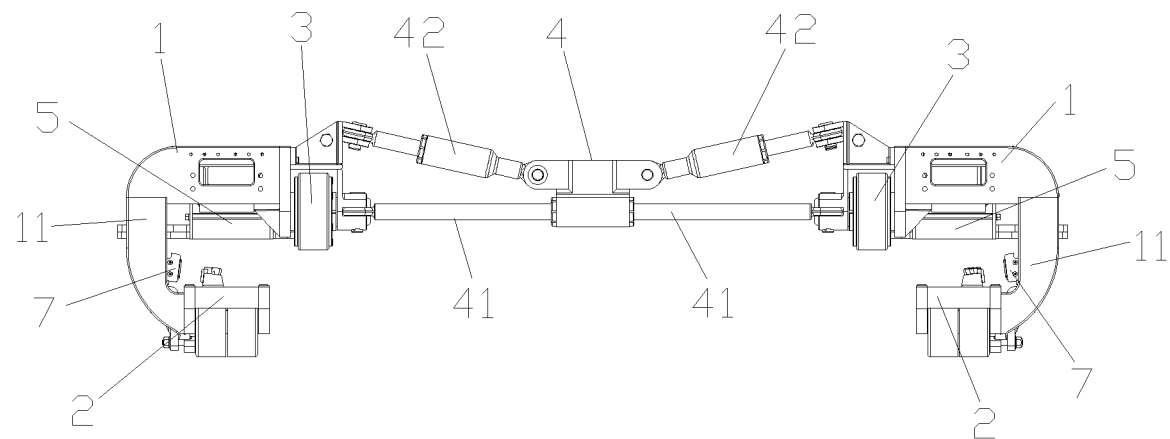
FIG. 3 is a left view of the suspension frame shown in FIG. 2.
Figure 4:
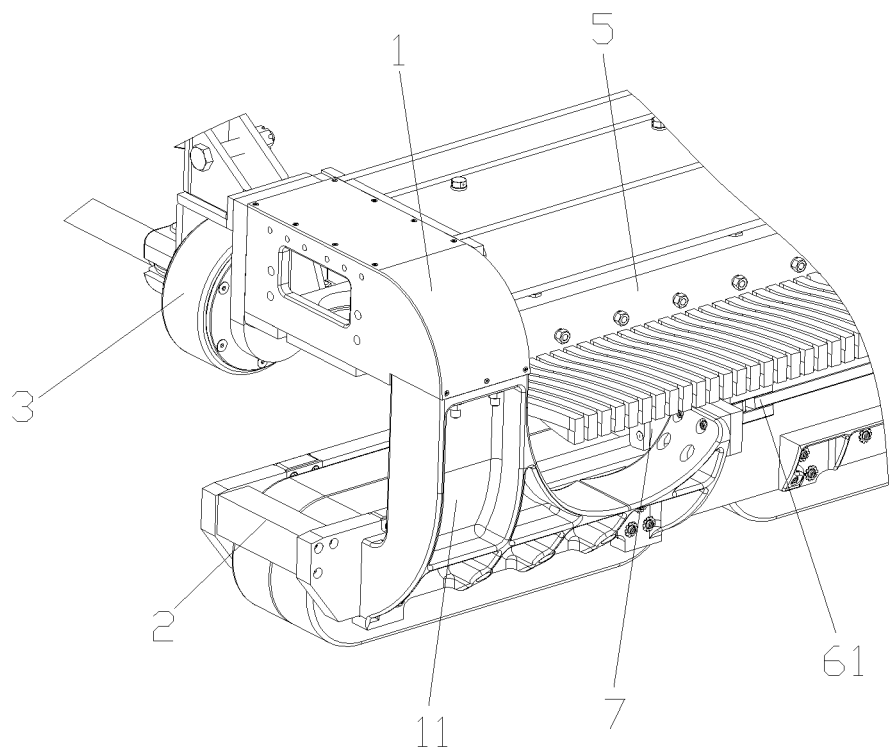
FIG. 4 is a partially enlarged view of a longitudinal beam body of the suspension frame at an end position shown in FIG. 1.
Figure 5:
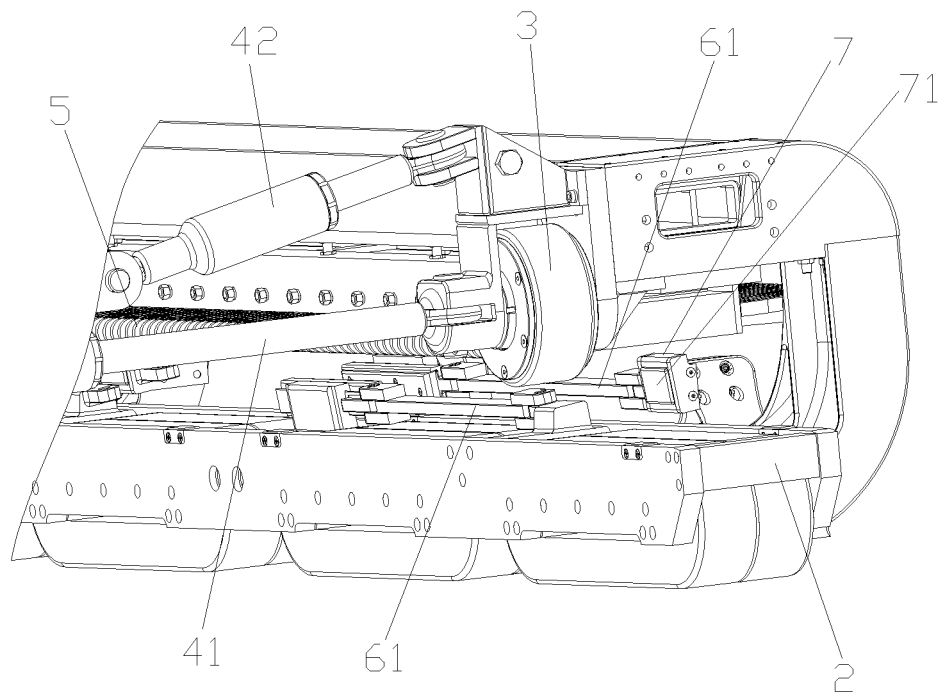
FIG. 5 is a partially enlarged view of the longitudinal beam body of the suspension frame at the end position shown in FIG. 1 viewed from another angle.

Reference is made to FIGS. 1 to 5, FIG. 1 is a schematic view showing the structure of a suspension frame of a magnetic levitation vehicle according to an embodiment of the present application; FIG. 2 is a front view of the suspension frame shown in FIG. 1; FIG. 3 is a left view of the suspension frame shown in FIG. 2; FIG. 4 is a partially enlarged view of a longitudinal beam body of the suspension frame at an end position shown in FIG. 1; FIG. 5 is a partially enlarged view of a longitudinal beam body of the suspension frame at an end position shown in FIG. 1 viewed from another angle.

The suspension frame assembly of the magnetic levitation vehicle according to the present application includes multiple suspension frames 100 which are sequentially connected, and each of the suspension frames 100 is arranged corresponding to a vehicle body 200 of the magnetic levitation vehicle.

In this embodiment, each of the suspension frames 100 of the suspension frame assembly includes:

two longitudinal beam bodies 1 arranged in parallel, and a supporting wheel 3 and a holding arm 11 are fixedly provided on both ends of each of the longitudinal beam bodies 1;

where the structure of four supporting wheels 3 forms a four-point supporting of the suspension frame 100 on the F type rail bearing surface, and on the rail in a horizontal state, in order to ensure the level of the suspension frame 100, it can be understood that the supporting points of the four supporting wheels 3 are at the same horizontal plane.

Specifically, the supporting wheel 3 can be fixed to a mounting frame, and the mounting frame is fixedly connected to the longitudinal beam body 1 in a detachable manner by bolts or the like.

Two anti-rolling devices 4 are mounted between the mounting frames of two of the supporting wheels 3 at the same end of the two longitudinal beam bodies 1.

It should be noted that the suspension frames shown in FIGS. 1 to 5 do not show the structure of the air-spring arm beam.

Figure 6:
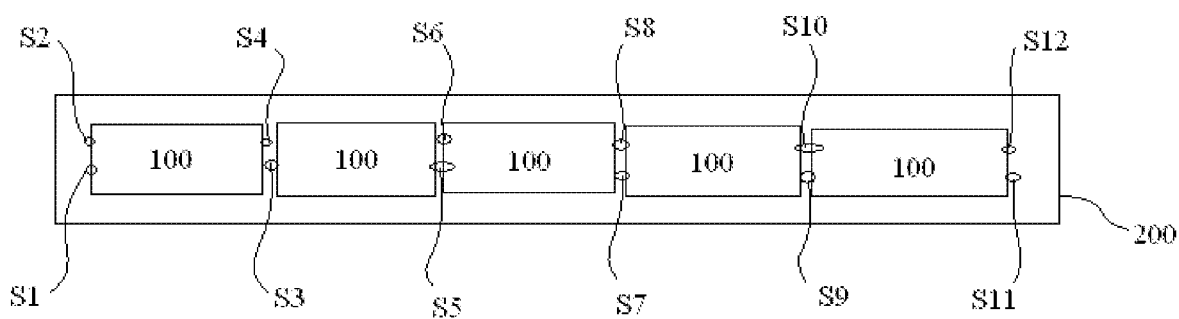
FIG. 6 is a schematic view showing the structure of a suspension frame assembly according to the present application.

Referring to FIG. 6, it is a schematic view showing the structure of the suspension frame assembly, in which, as an example, the suspension frame assembly is formed by five sequentially connected suspension frames.

In the suspension frame assembly, the two longitudinal beam bodies 1 of one of the suspension frames 100 are respectively hingedly connected to the two longitudinal beam bodies 1 of an adjacent suspension frame 100, an air-spring arm beam 8 for mounting an air spring is provided at the hinged part of the two adjacent suspension frames 100, and the air-spring arm beam 8 is mounted on the holding arm 11 of one of the two longitudinal beam bodies 1 that are hingedly connected. In addition, each holding arm 11 of the two longitudinal beam bodies 1 at two ends of the suspension frame assembly is mounted with the air-spring arm beam 8 for mounting the air spring.

Reference numerals S1 to S12 in FIG. 6 denote the mounting positions of the air springs, and it is understood that the figure simply shows the mounting positions of the air springs.

Figure 7:
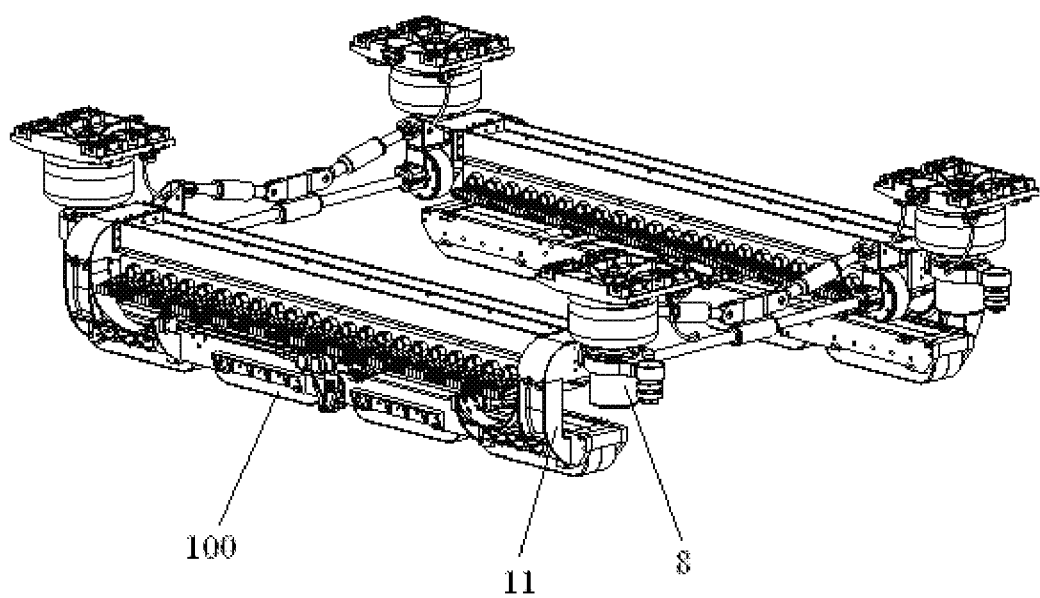
FIG. 7 is a schematic view showing the structure of a suspension frame at an end of the suspension frame assembly according to an embodiment.

In a specific embodiment, in the suspension frame assembly, the air-spring arm beam 8 may be provided at each of the four corners of the suspension frame 100 at the end portions of the suspension frame assembly, that is, at both ends of the two longitudinal beam bodies 1, and as shown in FIG. 7, the air-spring arm beam 8 is mounted on the holding arm 11.

It can be understood that in the suspension frame assembly, the number of the air-spring arm beams 8 arranged on each of the suspension frames 100 may vary as long as the above requirements are met.

The structural design of the air-spring arm beam 8 and the air spring can carry part of the load in the situation when there is no suspension force or the adjacent suspension frame 100 fails, and can also solve the safety problem of the degraded operation of the adjacent suspension frame 100 in the event of failure.

As above, the suspension frame assembly of the magnetic levitation vehicle according to the present application includes multiple suspension frames 100 which are sequentially connected. In each of the suspension frames 100, a supporting wheel 3 is fixed at both ends of each of the longitudinal beam bodies 1. Compared with the existing hydraulic lifting supporting wheel which is commonly used, the supporting wheel 3 with the fixed form can save the hydraulic structure, which helps to reduce the overall weight of the single suspension frame 100, thereby reducing the overall weight of the suspension frame assembly. Meanwhile, in the suspension frame assembly, an air-spring arm beam 8 for mounting an air spring is provided at a hinged part of the two adjacent suspension frames 100, and each holding arm of the two longitudinal beam bodies at both ends of the suspension frame assembly are mounted with the air-spring arm beam 8 for mounting the air spring. Thus, compared with the existing solution that four ends of each of the suspension frames of the suspension frame assembly are provided with the air springs, the number of the air springs can be greatly reduced, and the overall weight of the suspension frame assembly can be further reduced, and in conjunction with the above supporting wheel with the fixed form, the suspension frame assembly is more lightweight, thereby improving the suspension capability. In addition, the reduction in the number of the air springs is also advantageous for the cooperative control of the air springs, improving the flexibility of the control of the magnetic levitation vehicle.

Each of the longitudinal beam bodies 1 is further provided with a suspension magnet module 2, and the suspension magnet module 2 extends in the length direction of each of the longitudinal beam bodies 1, and two end portions of the suspension magnet module 2 are fixedly connected to the two holding arms 11 of the corresponding longitudinal beam body 1, respectively.

Specifically, two ends of the suspension magnet module 2 may be fixed to the lower ends of the holding arms 11 by bolt connection.

Further, an anti-vibration plate 12 is provided on a middle portion of the suspension magnet module 2, and the anti-vibration plate 12 made of forged aluminum material is symmetrically arranged with respect to the middle portion of the suspension magnet module 2, and is directly fixed on the suspension magnet module by bolt connection, to prevent the magnetic levitation vehicle from generating lateral vibration in the curve section and from increasing rigidity.

As shown in FIG. 3, in a specific solution, each of two sides of the anti-rolling device 4 is connected to the mounting frame of the supporting wheel 3 at the corresponding side by a diagonal pull rod 42 and a horizontal pull rod 41.

Specifically, the diagonal pull rod 42 is hingedly connected to the mounting frame of the supporting wheel 3 by a ball joint bearing for the diagonal pull rod to make the diagonal pull rod 42 have a predetermined rotation angle adjustment range; the horizontal pull rod 41 is hingedly connected to the mounting frame of the supporting wheel 3 by a ball joint bearing for the horizontal pull rod, to make the horizontal pull rod 41 have a predetermined rotation angle adjustment range.

With the above setting, when the magnetic levitation vehicle passes the curve, the anti-rolling devices 4 can flexibly adjust the posture of the suspension frame assembly in the curve section, and can avoid the fluctuation of the suspension gap between the F type rail magnetic pole surface and the suspension magnets at both sides of the suspension frame assembly, thereby eliminating the influence on the suspension force attenuation, and improving the safe passing capability of the vehicle in the curve section.

Specifically, two ear plates at corresponding positions and spaced by a certain interval are provided on the mounting frame of the supporting wheel 3. The end of the horizontal pull rod 41 is inserted between the corresponding two ear plates, and the horizontal pull rod 41 and the two ear plates are connected by a pin. The ball joint bearing for the horizontal pull rod is provided at the connection position, and has a rotation angle adjustment range of about 6 degrees.

The specific mounting form of the diagonal pull rod 42 can be similar to this, and will not be described again, and the ball joint bearing of the diagonal pull rod also has a rotation angle adjustment range of about 6 degrees.

It should be understood that, in actual setting, the rotation angle adjustment ranges of the ball joint bearings for the horizontal pull rod and the diagonal pull rod can be adjusted according to the application requirement, to improve the curve passing capability of the vehicle.

In a specific solution, a lateral stop 7 is mounted on opposite sides of the two holding arms 11 of each of the longitudinal beam bodies 1, and a distance from the lateral stop 7 to an end of the suspension magnet module 2 at the corresponding side is ⅕ of the length of the suspension magnet module 2. This arrangement can make the magnetic levitation vehicle to form an optimum lateral positioning function at the fit point of the suspension magnet module 2 and the F type rail in the minimum curve section.

In a specific solution, a brake caliper 6 is mounted on a middle of each of the longitudinal beam bodies 1, and a pull rod 61 is provided on both sides of the brake caliper 6. The pull rod 61 has one end hingedly connected to the brake caliper 6, and another end hingedly connected to the lateral stop 7 at the corresponding side, to maintain the transmission of braking force during braking of the vehicle.

Specifically, a wear-resistant member 71 is fixed on an inner side of the lateral stop 7, to alleviate the wear of the lateral stop 7 and to extend the service life of the lateral stop 7.

The wear-resistant member 71 can be specifically fastened to the lateral stop 7 by a fixing piece and a screw, to facilitate replacement of the wear-resistant member 71.

In a specific solution, the holding arm 11 can be made of forged aluminum, which facilitates processing and reduces the weight. On this basis, the mounting structure of the lateral stop 7 can be directly forged on the holding arm 11 made of forged aluminum, and the lateral stop 7 is directly mounted and fixed on the holding arm 11. Compared with the existing structure in which the lateral stop is fixed on the suspension magnet pole plate, the structure of the present solution can avoid the situation that the magnetic resistance increases when the vehicle is traveling because of the lateral stop being attracted to the F type rail.

In a specific solution, each of the longitudinal beam bodies 1 is further provided with a traction linear motor 5 extending along a length direction of the longitudinal beam body 1, and the traction linear motor 5 is provided for providing longitudinal thrust.

Specifically, a linear motor beam 13 is mounted between the two holding arms 11 of the longitudinal beam body 1 and the traction linear motor 5 is mounted on the linear motor beam 13.

The linear motor beam 13 can be embodied as an extruded aluminum profile structure, which facilitates processing, has a reliable structure and a light weight.

The suspension frame assembly of the magnetic levitation vehicle according to the present application is described in detail above. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of protection of the present application defined by the claims.

The invention claimed is:

1. A suspension frame assembly for a magnetic levitation vehicle, comprising: a plurality of suspension frames which are sequentially connected; and each of the suspension frames comprising:
   two longitudinal beam bodies arranged in parallel, wherein a supporting wheel and a holding arm are fixedly provided on both ends of each of the longitudinal beam bodies; and
   two anti-rolling devices, which are mounted between mounting frames of two of the supporting wheels at a same end of the two longitudinal beam bodies; and
   wherein the two longitudinal beam bodies of one of the suspension frames are respectively hingedly connected to the two longitudinal beam bodies of an adjacent suspension frame; an air-spring arm beam for mounting an air spring is provided at a hinged part of the two suspension frames, and the air-spring arm beam is mounted on the holding arm of one of the two longitudinal beam bodies which are hingedly connected; and each holding arm of the two longitudinal beam bodies at both ends of the suspension frame assembly is mounted with the air-spring arm beam for mounting the air spring.

2. The suspension frame assembly according to claim 1, wherein both sides of each of the anti-rolling devices are each connected to the mounting frame of the supporting wheel at a corresponding side by a diagonal pull rod and a horizontal pull rod.

3. The suspension frame assembly according to claim 2, wherein the diagonal pull rod is hingedly connected to the mounting frame of the supporting wheel by a ball joint bearing for the diagonal pull rod, to allow the diagonal pull rod to have a predetermined rotation angle adjustment range; the horizontal pull rod is hingedly connected to the mounting frame of the supporting wheel by a ball joint bearing for the horizontal pull rod, to allow the horizontal pull rod to have a predetermined rotation angle adjustment range.

4. The suspension frame assembly according to claim 1, wherein a lateral stop is mounted on each of opposite sides of the two holding arms of each of the longitudinal beam bodies, and a distance from the lateral stop to an end of the suspension magnet module at a corresponding side is 1/5 of a length of the suspension magnet module.

5. The suspension frame assembly according to claim 4, wherein a brake caliper is mounted on a middle portion of each of the longitudinal beam bodies, a pull rod is provided on both sides of the brake caliper, and the pull rod has one end hingedly connected to the brake caliper and another end hingedly connected to the lateral stop at a corresponding side.

6. The suspension frame assembly according to claim 4, wherein a wear-resistant member is fixed on an inner side of the lateral stop.

7. The suspension frame assembly according to claim 1, wherein each of the suspension frames further comprises:
   two suspension magnet modules respectively provided on the two longitudinal beam bodies, and two ends of each of the suspension magnet modules are fixedly connected to the holding arms at the corresponding sides respectively.

8. The suspension frame assembly according to claim 7, wherein an anti-vibration plate is provided at a middle portion of each of the suspension magnet modules.

9. The suspension frame assembly according to claim 1, wherein each of the longitudinal beam bodies is further provided with a traction linear motor extending along a length direction of the longitudinal beam body.

10. The suspension frame assembly according to claim 9, wherein each of the longitudinal beam bodies comprises a linear motor beam mounted between the two holding arms and configured to mount the traction linear motor.

11. The suspension frame assembly according to claim 2, wherein each of the suspension frames further comprises:
   two suspension magnet modules respectively provided on the two longitudinal beam bodies, and two ends of each of the suspension magnet modules are fixedly connected to the holding arms at the corresponding sides respectively.

12. The suspension frame assembly according to claim 2, wherein each of the longitudinal beam bodies is further provided with a traction linear motor extending along a length direction of the longitudinal beam body.

13. The suspension frame assembly according to claim 3, wherein each of the suspension frames further comprises:
   two suspension magnet modules respectively provided on the two longitudinal beam bodies, and two ends of each of the suspension magnet modules are fixedly connected to the holding arms at the corresponding sides respectively.

14. The suspension frame assembly according to claim 3, wherein each of the longitudinal beam bodies is further provided with a traction linear motor extending along a length direction of the longitudinal beam body.

15. The suspension frame assembly according to claim 4, wherein each of the suspension frames further comprises:
   two suspension magnet modules respectively provided on the two longitudinal beam bodies, and two ends of each of the suspension magnet modules are fixedly connected to the holding arms at the corresponding sides respectively.

16. The suspension frame assembly according to claim 4, wherein each of the longitudinal beam bodies is further provided with a traction linear motor extending along a length direction of the longitudinal beam body.

17. The suspension frame assembly according to claim 5, wherein each of the suspension frames further comprises:
   two suspension magnet modules respectively provided on the two longitudinal beam bodies, and two ends of each of the suspension magnet modules are fixedly connected to the holding arms at the corresponding sides respectively.

18. The suspension frame assembly according to claim 5, wherein each of the longitudinal beam bodies is further provided with a traction linear motor extending along a length direction of the longitudinal beam body.

* * * * *